US010696194B1

(12) United States Patent
Juhasz

(10) Patent No.: US 10,696,194 B1
(45) Date of Patent: Jun. 30, 2020

(54) VEHICLE SEAT WITH FOLD DOWN CHILD SEAT

(71) Applicant: Katalin Juhasz, Livingston, NJ (US)

(72) Inventor: Katalin Juhasz, Livingston, NJ (US)

( * ) Notice: Subject to any disclaimer, the term of this patent is extended or adjusted under 35 U.S.C. 154(b) by 49 days.

(21) Appl. No.: 16/208,718

(22) Filed: Dec. 4, 2018

(51) Int. Cl.
*A47C 15/00* (2006.01)
*B60N 2/30* (2006.01)
*B60R 22/10* (2006.01)
*B60N 2/26* (2006.01)

(52) U.S. Cl.
CPC .............. *B60N 2/3081* (2013.01); *B60N 2/26* (2013.01); *B60R 22/105* (2013.01)

(58) Field of Classification Search
CPC .... B60N 2/2821; B60N 2/2806; B60N 2/286; B60N 2/3081; B60N 2/3084; B60N 2/2878; B60N 2/2893; B60N 2/3086
USPC ....... 297/237, 238, 250.1, 256.13, 255, 239, 297/253
See application file for complete search history.

(56) References Cited

U.S. PATENT DOCUMENTS

| | | | | |
|---|---|---|---|---|
| 3,094,354 | A * | 6/1963 | Bernier | A47D 11/02 297/112 |
| 4,690,455 | A * | 9/1987 | Bailey | B60N 2/3084 297/117 |
| 4,936,627 | A | 6/1990 | Guim | |
| 4,986,600 | A * | 1/1991 | Leblanc | B60N 2/3084 297/112 |
| D315,453 | S | 3/1991 | Takada | |
| 5,282,667 | A | 2/1994 | Elton | |
| 5,472,260 | A | 12/1995 | Czapski | |
| 5,527,093 | A | 6/1996 | Park | |
| 5,704,685 | A * | 1/1998 | Handa | B60N 2/3084 297/238 |
| 5,743,593 | A | 4/1998 | Vogt | |
| 7,246,855 | B2 * | 7/2007 | Langmaid | B60N 2/2806 297/256.13 |
| 7,413,249 | B2 * | 8/2008 | Leutert | B60N 2/3081 297/237 |
| 7,871,124 | B1 | 1/2011 | Hinds | |
| 7,887,140 | B1 * | 2/2011 | Forlivio | B60N 2/26 297/238 |
| 9,227,535 | B2 * | 1/2016 | Coman | B60N 2/3084 |
| 9,764,662 | B1 * | 9/2017 | Ramos Valencia | B60N 2/3084 |
| 9,796,303 | B1 * | 10/2017 | Schonfeld | B60N 2/3084 |
| 10,137,805 | B1 * | 11/2018 | McKenzie | B60N 2/2878 |

(Continued)

FOREIGN PATENT DOCUMENTS

EP 0663316 3/1998

*Primary Examiner* — Chi Q Nguyen
(74) *Attorney, Agent, or Firm* — Kyle A. Fletcher, Esq.

(57) ABSTRACT

A vehicle seat with fold down child seat includes a passenger seat and a convertible child seat section. In a first seat configuration, the convertible child seat section may be for use by an adult or adolescent. In a second seat configuration, the convertible child seat section may be for use by a child. The convertible child seat section may includes a child seat back that rotates to present a front side for adult seating or a rear side for child seating and a child seat cushion that rotates to present a top side for adult seating or a bottom side for child seating. The seat back and seat cushion may rotate on a seat back spindle and seat bottom cushion, respectively. The convertible child seat section may include a harness. A vehicle seat may comprise multiple convertible child seat sections.

17 Claims, 4 Drawing Sheets

(56) References Cited

U.S. PATENT DOCUMENTS

| | | | |
|---|---|---|---|
| 10,259,345 B2 * | 4/2019 | Schonfeld | B60N 2/0292 |
| 2008/0100109 A1 | 5/2008 | Frank | |
| 2012/0228909 A1 * | 9/2012 | Blau | B60N 2/2806 297/238 |

* cited by examiner

VEHICLE SEAT WITH FOLD DOWN CHILD SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of vehicular seating and child car seats, more specifically, a vehicle seat with fold down child seat.

SUMMARY OF INVENTION

The vehicle seat with fold down child seat comprises a passenger seat and a convertible child seat section. In a first seat configuration, the convertible child seat section may be adapted for use by an adult or adolescent. In a second seat configuration, the convertible child seat section may be adapted for use by a child. The convertible child seat section may comprise a child seat back that rotates to present a front side for adult seating or a rear side for child seating and a child seat cushion that rotates to present a top side for adult seating or a bottom side for child seating. The seat back and seat cushion may rotate on a seat back spindle and seat bottom cushion, respectively. The convertible child seat section may comprise a harness. A vehicle seat may comprise multiple convertible child seat sections.

An object of the invention is to provide a vehicle seat with one or more convertible child seat sections.

Another object of the invention is to provide a first configuration of the convertible child seat section adapted for use by an adult or adolescent.

A further object of the invention is to provide a second configuration of the convertible child seat section adapted for use by a child.

Yet another object of the invention is to convert between the first configuration and the second configuration or vice versa by rotating the seat back and seat cushion.

These together with additional objects, features and advantages of the vehicle seat with fold down child seat will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle seat with fold down child seat in detail, it is to be understood that the vehicle seat with fold down child seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle seat with fold down child seat.

It is therefore important that the claims be regarded as including such equivalent construction insofar as they do not depart from the spirit and scope of the vehicle seat with fold down child seat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
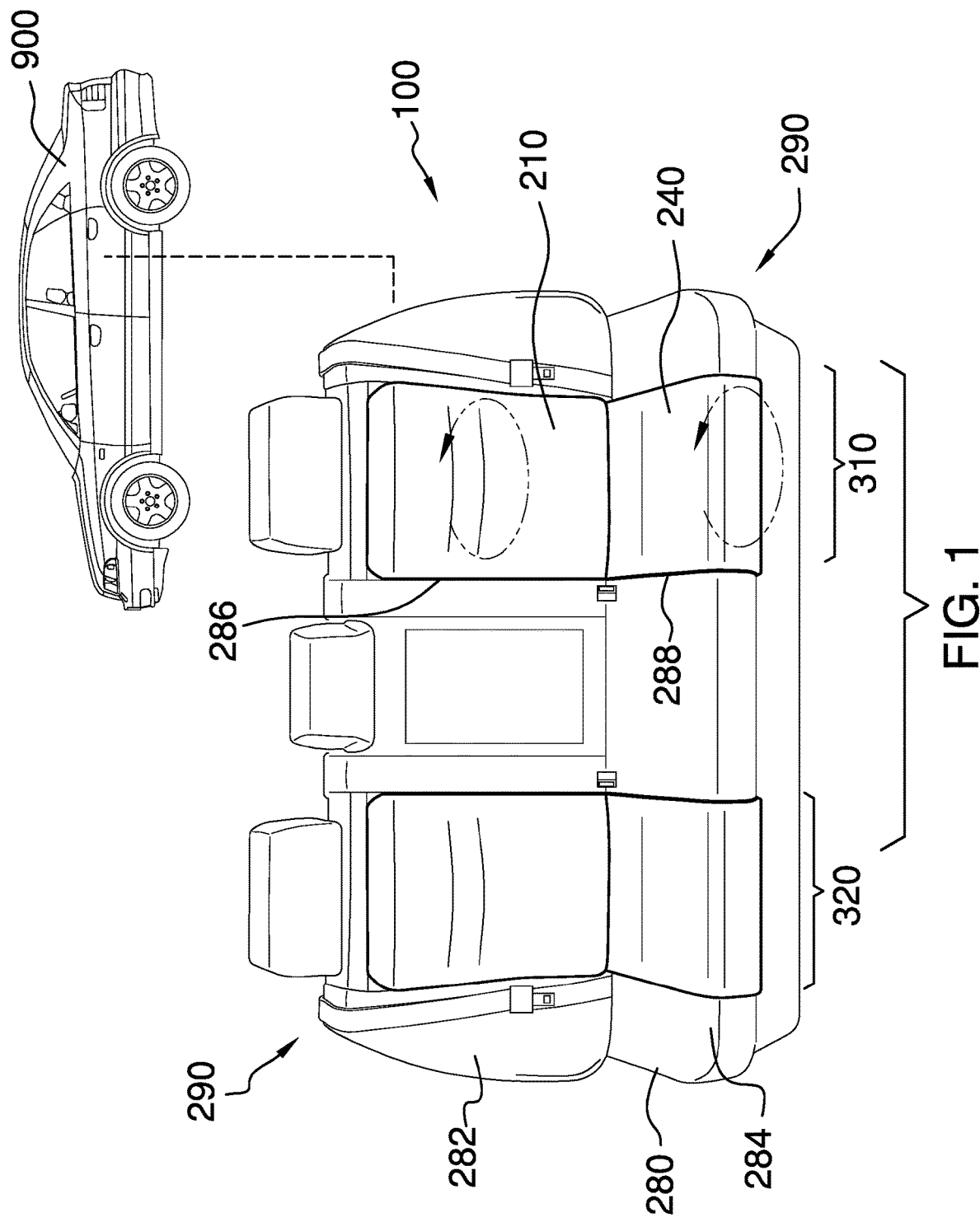
FIG. 1 is a perspective view of an embodiment of the disclosure illustrating two convertible child seat sections both in the first configuration.
Figure 2:
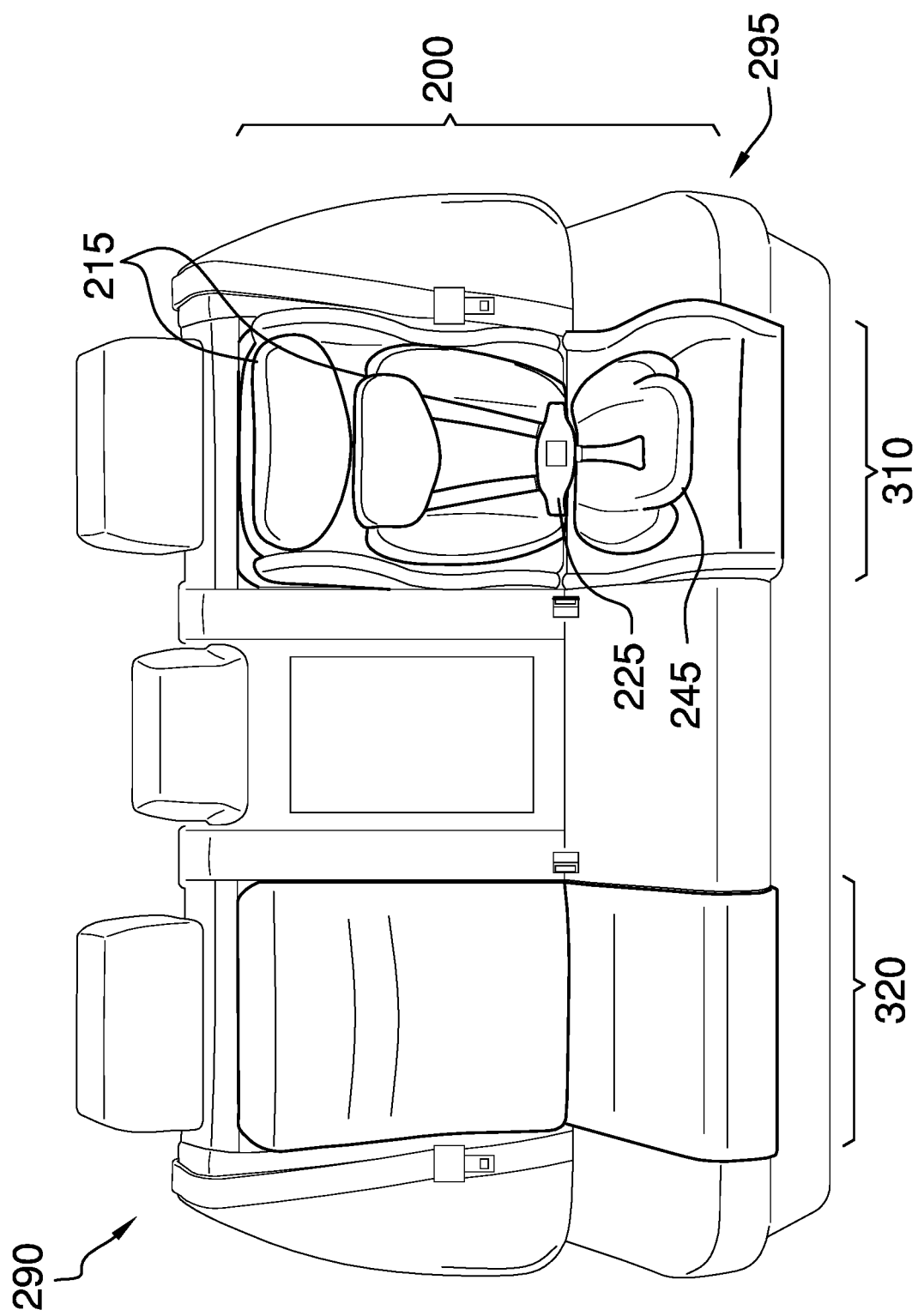
FIG. 2 is a perspective view of an embodiment of the disclosure illustrating two convertible child seat sections with the left convertible child seat section in the first configuration and the right convertible child seat section in the second configuration.
Figure 3:
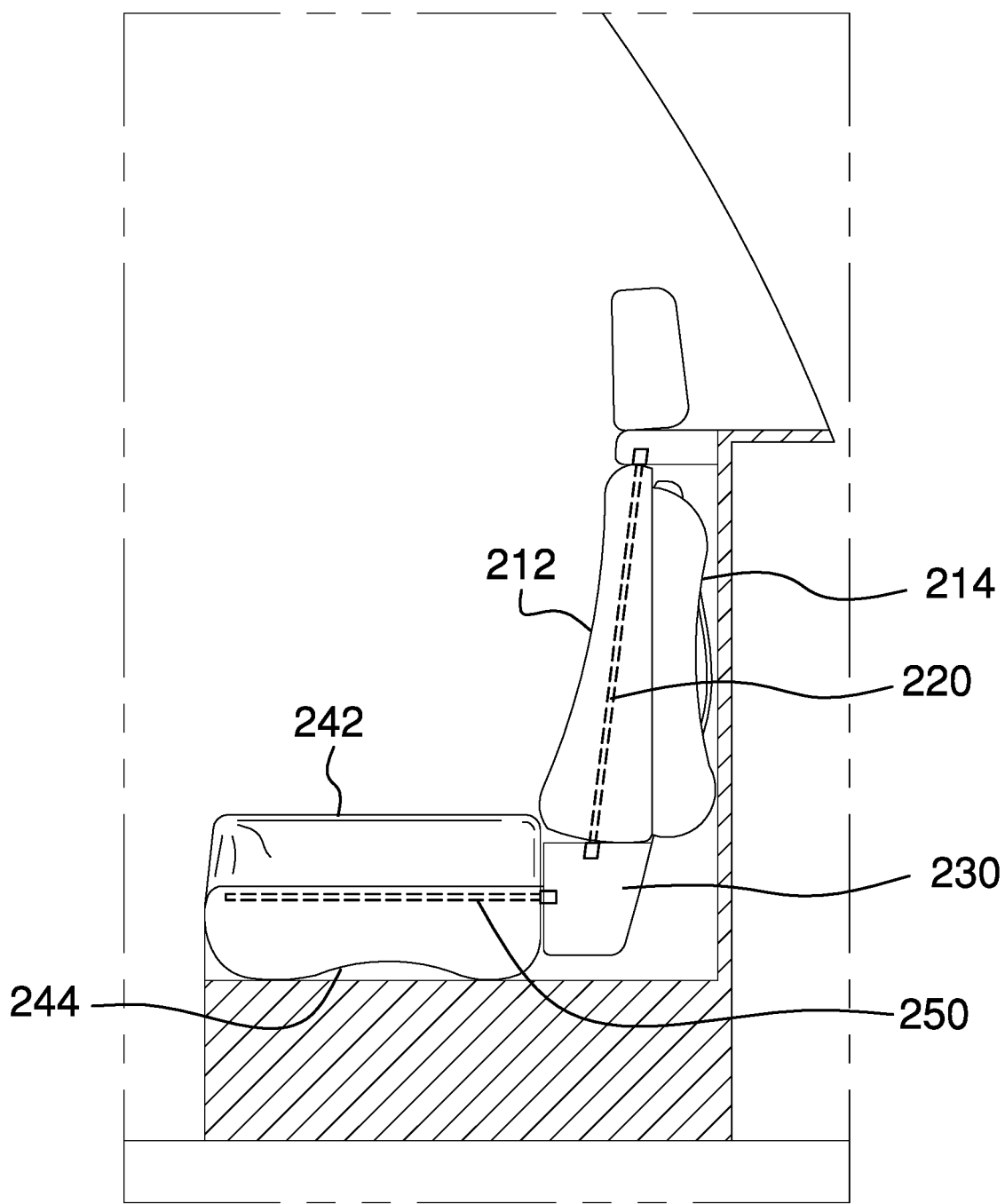
FIG. 3 is a side view of an embodiment of the disclosure illustrating the convertible child seat section in the first configuration.
Figure 4:
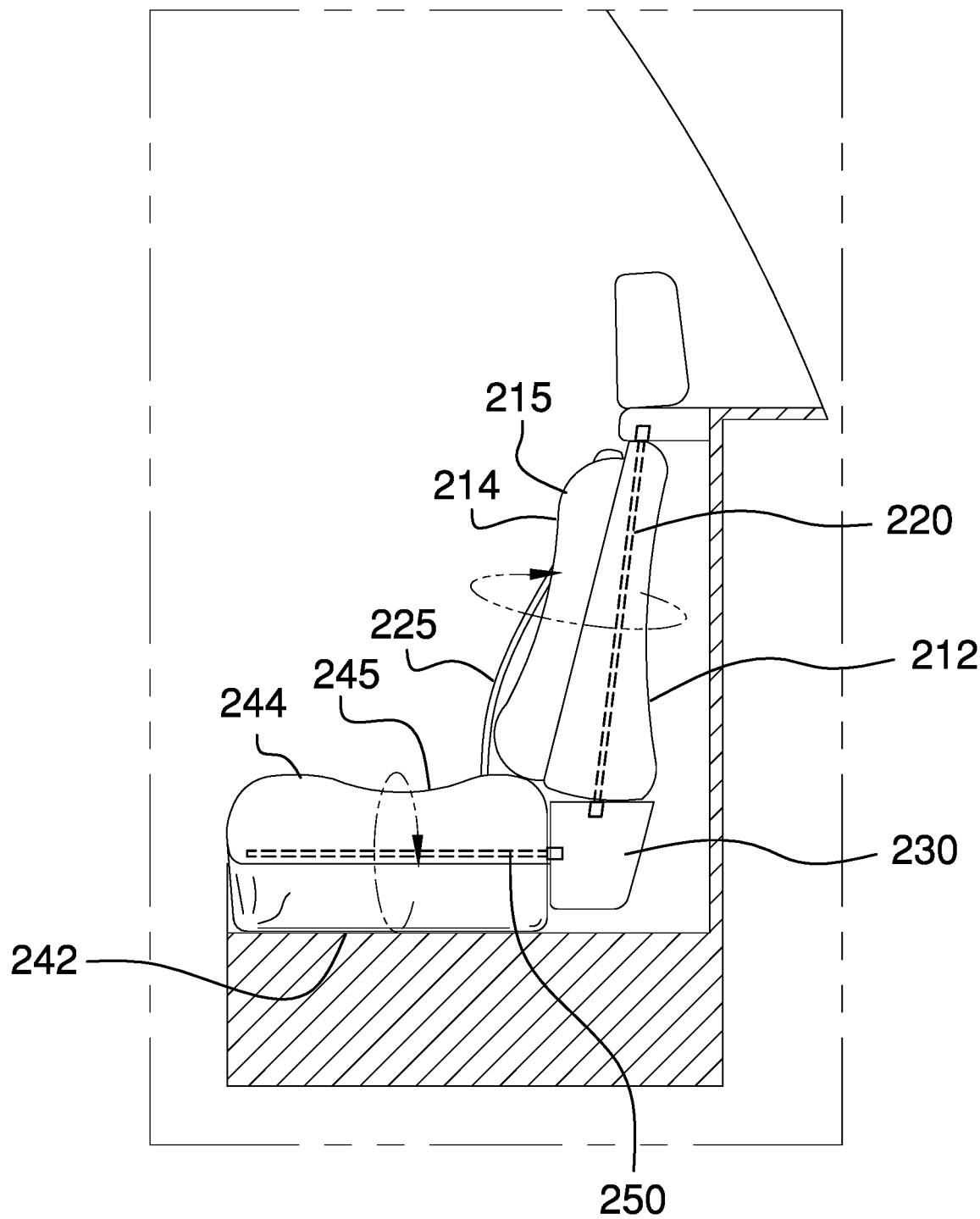
FIG. 4 is a side view of an embodiment of the disclosure illustrating the convertible child seat section in the second configuration.

Detailed reference will now be made to a first potential embodiment of the disclosure, which is illustrated in FIGS. 1 through 4.

The vehicle seat with fold down child seat 100 (hereinafter invention) comprises a passenger seat 280 and a convertible child seat section 200. The convertible child seat section 200 may be a reconfigurable section of the passenger seat 280 in a vehicle 900. In a first seat configuration 290, the convertible child seat section 200 may be adapted for use by an adult or adolescent. In a second seat configuration 295, the convertible child seat section 200 may be adapted for use by a child.

The passenger seat 280 may comprise a passenger seat back 282 and a passenger seat cushion 284. The passenger seat 280 may be adapted to be a seating area for at least one passenger. The passenger seat back 282 may be a substantially vertical area that is adapted for the at least one passenger to lean their back against. The passenger seat back 282 may comprise a seat back cavity 286. The seat back cavity 286 may be at least as large as a child seat back 210. The passenger seat cushion 284 may be a substantially horizontal area that is adapted for the at least one passenger to sit upon. The passenger seat cushion 284 may comprise a seat cushion cavity 288. The seat cushion cavity 288 may be at least as large as a child seat cushion 240.

The convertible child seat section 200 may comprise the child seat back 210, the child seat cushion 240, a child seat back spindle 220, and a child seat bottom spindle 250. The convertible child seat section 200 may be located within the passenger seat 280. The convertible child seat section 200 may reconfigure between the first seat configuration 290 and the second seat configuration 295 by reversing the position of the child seat back 210 and the child seat cushion 240.

The child seat back 210 may comprise a seat back front side 212 and a seat back rear side 214. The child seat back 210 may reside within the seat back cavity 286 located in the passenger seat back 282. The child seat back 210 may be oriented to be substantially vertical. The seat back front side 212 and the seat back rear side 214 may be located on opposing sides of the child seat back 210.

The seat back front side 212 may be presented to an interior of the vehicle when the convertible child seat section 200 is in the first seat configuration 290. The seat back front side 212 may align with and form a continuation of the plane of the passenger seat back 282 when the convertible child seat section 200 is in the first seat configuration 290. When the convertible child seat section 200 is in the second seat configuration 295, the seat back front side 212 may be located behind the child seat back 210 and may be inaccessible.

The seat back rear side 214 may be presented to the interior of the vehicle when the convertible child seat section 200 is in the second seat configuration 295. The seat back rear side 214 may align with and may be elevated above the plane of the passenger seat back 282 when the convertible child seat section 200 is in the second seat configuration 295. The seat back rear side 214 may comprise a contoured back 215. The contoured back 215 may be adapted to shape the surface of the seat back rear side 214 to fit the body of the child for comfort and/or safety.

The child seat cushion 240 may comprise a seat cushion top side 242 and a seat cushion bottom side 244. The child seat cushion 240 may reside within the seat cushion cavity 288 located in the passenger seat cushion 284. The child seat cushion 240 may be oriented to be substantially vertical. The seat cushion top side 242 and the seat cushion bottom side 244 may be located on opposing sides of the child seat cushion 240.

The seat cushion top side 242 may be presented to the interior of the vehicle when the convertible child seat section 200 is in the first seat configuration 290. The seat cushion top side 242 may align with and form a continuation of the plane of the passenger seat cushion 284 when the convertible child seat section 200 is in the first seat configuration 290. When the convertible child seat section 200 is in the second seat configuration 295, the seat cushion top side 242 may be located behind the child seat cushion 240 and may be inaccessible.

The seat cushion bottom side 244 may be presented to the interior of the vehicle when the convertible child seat section 200 is in the second seat configuration 295. The seat cushion bottom side 244 may align with and may be elevated above the plane of the passenger seat cushion 284 when the convertible child seat section 200 is in the second seat configuration 295. The seat cushion bottom side 244 may comprise a contoured cushion 245. The contoured cushion 245 may be adapted to shape the surface of the seat cushion bottom side 244 to fit the body of the child for comfort and/or safety.

The child seat back 210 may reconfigure by rotating 180 degrees around the child seat back spindle 220. At least one end of the child seat back spindle 220 may be coupled to the passenger seat back 282 or to a frame 230 of the passenger seat 280. The child seat back spindle 220 may pass through the center of the child seat back 210. In some embodiments, the child seat back spindle 220 may be vertically oriented.

The child seat cushion 240 may reconfigure by rotating 180 degrees around the child seat bottom spindle 250. At least one end of the child seat bottom spindle 250 may be coupled to the passenger seat cushion 284 or to the frame 230 of the passenger seat 280. The child seat bottom spindle 250 may pass through the center of the child seat cushion 240. In some embodiments, the child seat bottom spindle 250 may be oriented from back to front.

The convertible child seat section 200 may further comprise a harness 225. The harness 225 may be a multi-point restraint that couples to the seat back rear side 214, to the seat cushion bottom side 244, or to combinations thereof. The harness 225 may be adapted to fasten around the child when the convertible child seat section 200 is in the second seat configuration 295 to secure the child.

The invention 100 may further comprise multiple convertible child seat sections. A first convertible seat section 310 may be located on one side of the passenger seat 280. A second convertible seat section 320 may be located on the other side of the passenger seat 280. The first convertible seat section 310 and the second convertible seat section 320 may be deployed independently or simultaneously.

In use, the convertible child seat section 200 may be used by the adult or adolescent when the convertible child seat section 200 is in the first seat configuration 290. The convertible child seat section 200 may be deployed for use by the child by rotating the child seat back 210 180 degrees such that the seat back front side 212 moves to the rear side of the child seat back 210 and the seat back rear side 214 moves to the front of the child seat back 210 and by rotating the child seat cushion 240 180 degrees such that the seat cushion bottom side 244 moves to the top of the child seat cushion 240 and the seat cushion top side 242 moves to the bottom of the child seat cushion 240. The child may then be placed onto the convertible child seat section 200 and the harness 225 may be fastened to hold the child in place. When no longer needed and with the child removed from the convertible child seat section 200, the child seat back 210 and the child seat cushion 240 may again be rotated 180 degrees to bring the seat back front side 212 and the seat cushion top side 242 into position on the front and top of the convertible child seat section 200.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "align" refers to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" is an opening in a surface. Aperture may be synonymous with hole, slit, crack, gap, slot, or opening.

As used in this disclosure, a "cavity" is an empty space or negative space that is formed within an object.

As used herein, the words "couple", "couples", "coupled" or "coupling", refer to connecting, either directly or indirectly, and does not necessarily imply a mechanical connection.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "harness" is an apparatus comprising a plurality of straps and one or more fasteners that is used to fasten or anchor a first person or first object to a second object. The phrase "N point harness" refers to the installation of the harness wherein the harness has N anchor points. As a non-limiting example, a 2-point harness has two anchor points while a 5-point harness has 5 anchor points.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "interior" is used as a relational term that implies that an object is located or contained within the boundary of a structure or a space.

As used herein, "multi-point" refers to a seatbelt, harness, or restraint that couples to a seat or other base object in at least three locations.

As used herein, "substantially horizontal" refers to the orientation of one or more elements. Substantially horizontal elements are within 22.5 degrees of a true horizontal orientation.

As used herein, "substantially vertical" refers to the orientation of one or more elements. Substantially vertical elements are within 22.5 degrees of a true vertical orientation.

As used in this disclosure, a "vehicle" is a device that is used for transporting passengers, goods, or equipment.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A vehicle seat with fold down child seat comprising:
   a passenger seat and a convertible child seat section;
   wherein the convertible child seat section is a reconfigurable section of the passenger seat in a vehicle;
   wherein in a first seat configuration, the convertible child seat section is adapted for use by an adult or adolescent;
   wherein in a second seat configuration, the convertible child seat section is adapted for use by a child;
   wherein the passenger seat back is a substantially vertical area that is adapted for the at least one passenger to lean their back against;
   wherein the passenger seat back comprises a seat back cavity;
   wherein the seat back cavity is at least as large as a child seat back;
   wherein the convertible child seat section comprises a child seat back, a child seat cushion, a child seat back spindle, and a child seat bottom spindle;
   wherein the convertible child seat section is located within the passenger seat.

2. The vehicle seat with fold down child seat according to claim 1
   wherein the passenger seat comprises a passenger seat back and a passenger seat cushion;
   wherein the passenger seat is adapted to be a seating area for at least one passenger.

3. The vehicle seat with fold down child seat according to claim 2
   wherein the passenger seat cushion is a substantially horizontal area that is adapted for the at least one passenger to sit upon;
   wherein the passenger seat cushion comprises a seat cushion cavity;
   wherein the seat cushion cavity is at least as large as a child seat cushion.

4. The vehicle seat with fold down child seat according to claim 3
   wherein the convertible child seat section reconfigures between the first seat configuration and the second seat configuration by reversing the position of the child seat back and the child seat cushion.

5. The vehicle seat with fold down child seat according to claim 4
   wherein the child seat back comprises a seat back front side and a seat back rear side;
   wherein the child seat back resides within the seat back cavity located in the passenger seat back;
   wherein the child seat back is oriented to be substantially vertical;
   wherein the seat back front side and the seat back rear side are located on opposing sides of the child seat back.

6. The vehicle seat with fold down child seat according to claim 5
   wherein the seat back front side is presented to an interior of the vehicle when the convertible child seat section is in the first seat configuration;

wherein the seat back front side aligns with and forms a continuation of the plane of the passenger seat back when the convertible child seat section is in the first seat configuration;

wherein when the convertible child seat section is in the second seat configuration, the seat back front side is located behind the child seat back and is inaccessible.

7. The vehicle seat with fold down child seat according to claim 6 wherein the seat back rear side is presented to the interior of the vehicle when the convertible child seat section is in the second seat configuration;

wherein the seat back rear side aligns with and is elevated above the plane of the passenger seat back when the convertible child seat section is in the second seat configuration;

wherein the seat back rear side comprises a contoured back;

wherein the contoured back is adapted to shape the surface of the seat back rear side to fit the body of the child.

8. The vehicle seat with fold down child seat according to claim 7 wherein the child seat cushion comprises a seat cushion top side and a seat cushion bottom side;

wherein the child seat cushion resides within the seat cushion cavity located in the passenger seat cushion;

wherein the child seat cushion is oriented to be substantially vertical;

wherein the seat cushion top side and the seat cushion bottom side are located on opposing sides of the child seat cushion.

9. The vehicle seat with fold down child seat according to claim 8 wherein the seat cushion top side is presented to the interior of the vehicle when the convertible child seat section is in the first seat configuration;

wherein the seat cushion top side aligns with and form a continuation of the plane of the passenger seat cushion when the convertible child seat section is in the first seat configuration;

wherein when the convertible child seat section is in the second seat configuration, the seat cushion top side is located behind the child seat cushion and is inaccessible.

10. The vehicle seat with fold down child seat according to claim 9 wherein the seat cushion bottom side is presented to the interior of the vehicle when the convertible child seat section is in the second seat configuration;

wherein the seat cushion bottom side aligns with and is elevated above the plane of the passenger seat cushion when the convertible child seat section is in the second seat configuration;

wherein the seat cushion bottom side comprises a contoured cushion;

wherein the contoured cushion is adapted to shape the surface of the seat cushion bottom side to fit the body of the child.

11. The vehicle seat with fold down child seat according to claim 10 wherein the child seat back reconfigures by rotating 180 degrees around the child seat back spindle;

wherein at least one end of the child seat back spindle is coupled to the passenger seat back or to a frame of the passenger seat;

wherein the child seat back spindle passes through the center of the child seat back.

12. The vehicle seat with fold down child seat according to claim 11 wherein the child seat back spindle is vertically oriented.

13. The vehicle seat with fold down child seat according to claim 11 wherein the child seat cushion reconfigures by rotating 180 degrees around the child seat bottom spindle;

wherein at least one end of the child seat bottom spindle is coupled to the passenger seat cushion or to the frame of the passenger seat;

wherein the child seat bottom spindle passes through the center of the child seat cushion.

14. The vehicle seat with fold down child seat according to claim 13 wherein the child seat bottom spindle is oriented from back to front.

15. The vehicle seat with fold down child seat according to claim 13 wherein the convertible child seat section further comprises a harness;

wherein the harness is a multi-point restraint that couples to the seat back rear side, to the seat cushion bottom side, or to combinations thereof;

wherein the harness is adapted to fasten around the child when the convertible child seat section is in the second seat configuration to secure the child.

16. The vehicle seat with fold down child seat according to claim 15 wherein the vehicle seat with fold down child seat further comprises multiple convertible child seat sections;

wherein a first convertible seat section is located on one side of the passenger seat;

wherein a second convertible seat section is located on the other side of the passenger seat.

17. The vehicle seat with fold down child seat according to claim 16 wherein the first convertible seat section and the second convertible seat section are deployed independently or simultaneously.

* * * * *